United States Patent [19]

Needham et al.

[11] Patent Number: 5,404,644
[45] Date of Patent: Apr. 11, 1995

[54] PORTABLE HAND-HELD CULTIVATOR AND TRIMMER

[76] Inventors: Kathleen M. Needham; George A. Needham, both of 127 Deep Woods Cir., Selma, Ala. 36701

[21] Appl. No.: 214,112

[22] Filed: Mar. 17, 1994

[51] Int. Cl.$^6$ ............................................. B25F 3/00
[52] U.S. Cl. ...................................... 30/123; 30/276; 172/378
[58] Field of Search ................ 30/123, 272.1, 275.4, 30/276, 277.4, 295, 347, 216, 228; 172/371, 378, 601, 15; 56/255, 295, 400.05, 400.07, 400.21

[56] References Cited

U.S. PATENT DOCUMENTS

| | | | |
|---|---|---|---|
| 2,091,827 | 8/1937 | Mercatoris | 30/276 |
| 2,720,696 | 10/1955 | Wadswprth | 30/41.5 |
| 2,954,832 | 10/1960 | Pirone | 172/378 |
| 3,077,664 | 2/1963 | Murawski | 30/276 |
| 3,958,331 | 5/1976 | Klebe, Jr. | 30/216 |
| 3,971,130 | 7/1976 | Querfurth et al. | 30/220 |
| 4,058,423 | 11/1977 | Bascom et al. | 30/152 |
| 4,089,379 | 5/1978 | Crownover | 172/378 |
| 4,515,223 | 5/1985 | Erickson | 172/371 |
| 4,641,431 | 2/1987 | Leming et al. | 30/276 |
| 4,736,573 | 4/1988 | Seck | 30/276 |
| 4,894,914 | 1/1990 | Mead | 30/276 |
| 4,987,681 | 1/1991 | Sepke | 30/276 |
| 5,031,323 | 7/1991 | Honsa et al. | 30/276 |

*Primary Examiner*—Hwei Siu Payer

[57] ABSTRACT

A portable hand-held device for combined cultivating and trimming of grass and plants includes a housing formed of upper and lower body portions which are coupled together and the device has the general configuration of an inverted cone truncated to allow the user to comfortably grasp and manipulate the device. The upper body includes a base portion which merges into generally vertically extending sidewalls that are joined to a top surface at the upper end portions of the sidewalls. The sidewalls include elongated recessed curved surfaces to improve the users grip on the device. An elongated strap element is connected to the upper body to extend across the top surface for maintaining the users hand in engagement with the housing. The lower body includes a support plate and a circumferential sidewall which define a cavity for enclosing a moving blade element that is powered by rechargeable batteries. Projections are formed on the circumferential sidewall for use in cultivating soil and dirt, and to guide plants to be trimmed into the blade cutting area.

14 Claims, 4 Drawing Sheets

PORTABLE HAND-HELD CULTIVATOR AND TRIMMER

BACKGROUND OF THE INVENTION

1. Field of the Invention

The present invention relates generally to portable cultivators and more particularly to hand-held devices for trimming plants, cutting grass and weeds and for cultivating the soil with precision.

2. Description of the Prior Art

Portable devices for cutting and trimming grass, weeds and plants are known in the prior art. For example, U.S. Pat. No. 3,971,130 discloses an electric grass shear having a handle provided with a switch for actuating an oscillating blade element positioned in front of the shear. U.S. Pat. No. 4,515,223 discloses a hand operated weeding device in which a planar blade element is designed to be secured to a handle shank and U.S. Pat. No. 4,736,573 discloses an improved guard and blade assembly for a rotary cutting machine. Further, U.S. Pat. No. 4,894,914 discloses a grass trimming device having an elongated handle and a cutting head which is capable of pivoting for cutting operations in either a horizontal plane or a vertical cutting plane such as for edge trimming operations. Also, U.S. Pat. No. 4,987,681 discloses a hand-held cordless grass and weed trimmer having detachable hub assemblies and a rake like guard for preventing large size objects from entering into the cutting path.

While the foregoing devices are illustrative of structures in which an elongated handle element is connected to a cutting head, the present invention is generally directed to a combined cultivating and trimming device for grass, plants and weeds in which the housing containing the cutting elements may function as a handle for the device. The device is also provided with cultivating elements which are capable of digging soil and moving dirt. The cultivating elements facilitate the precise trimming of small flowering plants by guiding the branches and shoots thereof to the rotating cutting blade.

SUMMARY OF THE INVENTION

To achieve the foregoing and other advantages, the present invention, briefly described, provides a portable hand-held combined cultivator and trimming device for grass, plants and weeds. The device includes a housing having an upper body and a lower body wherein the housing is preferably shaped to enable the user to readily grasp the device with either hand. The upper body is preferably formed with a base and generally vertically extending sidewalls having elongated curved depressions and a top surface secured to the upper portions of the sidewalls for allowing the device to be grasped by either hand. During normal operations the palm of the users hand normally rests on the top surface of the housing with the fingers of the hand contacting the sidewalls of the upper body. The lower body of the housing, which is connected to the base portion of the upper body, includes a circumferential sidewall for enclosing a blade element that is supported for cutting motions by a support plate that is connected to the circumferential sidewall. Movements of the blade element are produced by a power supply apparatus which preferably includes an electric motor connected to the blade element and batteries for supplying power to the electric motor.

To facilitate use of the device, an elongated strap element is connected to the housing and it extends across the top surface of the upper body so that the user can insert their hand between the strap and the top surface with their fingers engaging the sidewalls of the housing. An electrical switch element is positioned in the sidewalls of the housing so that the user can selectively operate the blade element with one hand by pressing their finger on the switch. The upper and lower bodies are connected together by employing coupling means on both the upper and lower bodies.

In addition to use as a trimming device, the present invention also is capable of functioning as a cultivator by utilization of digging implements such as prongs which are connected to the circumferential sidewall of the lower body for use in cultivating soil and dirt.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent construction insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved portable hand-held grass and weed trimming and cultivating device which has all of the advantages of the prior art and none of the disadvantages.

It is another object of the present invention to provide a new and improved portable hand-held cultivating and trimming device for grass and weeds which may be easily and efficiently manufactured and marketed.

It is a further objective of the present invention to provide a new and improved portable hand-held cultivating and trimming device which is of durable and reliable construction.

Still yet a further object of the present invention is to provide a new and improved portable hand-held cultivator and trimming device which is designed to provide and allow efficient operation in compact environments and which can be stored in an efficient manner when not in use.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved portable hand-held cultivator and trimmer for grass, weeds and plants embodying the principles and concepts of the present invention will be described.

Figure 2:
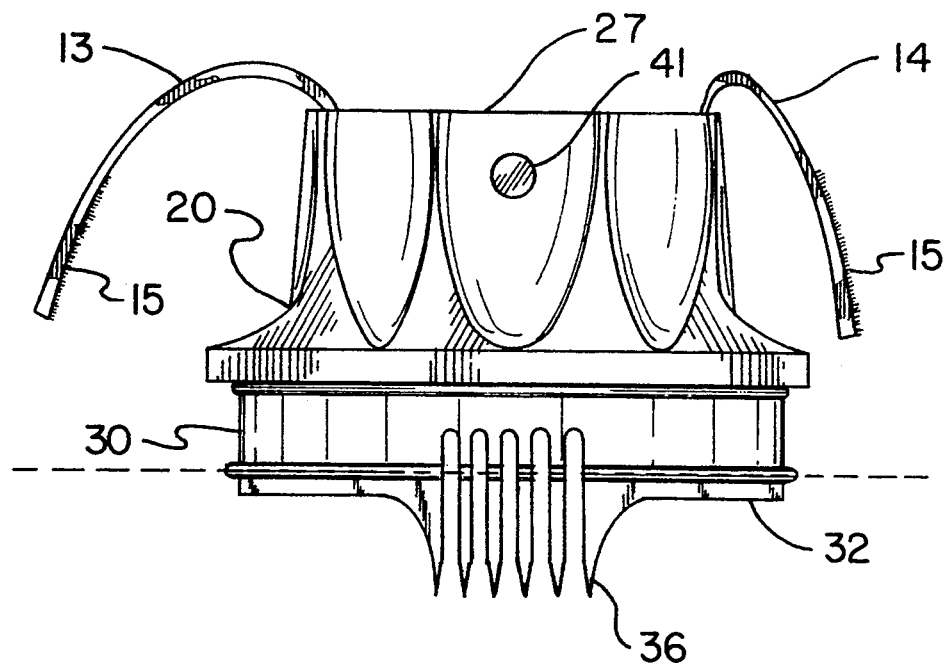
FIG. 2 is a side view of the portable hand-held device according to the present invention showing a front view of a cultivating element.

Referring now to the drawing figures, there is generally shown a perspective view of a portable hand-held cultivator and trimmer 10 for grass, weeds and plants constructed according to the present invention in which a manner of using the device is depicted with the users hand shown in broken lines. FIG. 2 shows one side view of the device and FIG. 3 shows another side view of the device in which the device viewed at a right angle to the view shown in FIG. 2.

Figure 3:
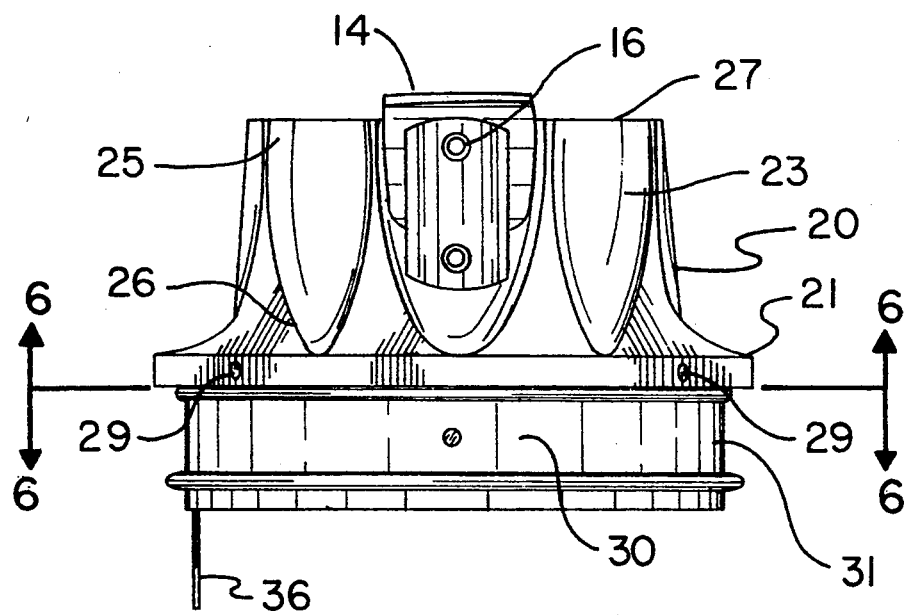
FIG. 3 is another side view of the portable hand-held device showing a view of FIG. 2 at right angles thereto.

As shown in FIGS. 2 and 3, the device 10 generally includes a housing formed of an upper body 20 and a lower body 30. The upper body 20 includes a lower base portion 21, a plurality of generally vertically extending sidewalls 23 and a top surface 27. The sidewalls which are shown to consist of a plurality of curved elongated finger-like depressions are preferably shaped to accommodate the users fingers and to enhance the ability of the user to grasp the housing. As further shown in FIGS. 2 and 3, the sidewalls 23 may slope inwardly from their lower portions 26 where they join the base 21 to their upper portions 25 where they join the top surface 27 to produce a plurality of scalloped edges 28. The overall shape of the upper body resembles an inverted truncated cone. The scalloped edges 28 of the top surface 27 of the upper body 20 and the fingerlike curved recessions of sidewalls 23 cooperate to facilitate a better grip on the device 10, especially when the user twists the device or during cultivating or digging procedures.

FIGS. 2 and 3 also depict an adjustable strap means, preferably in the form of two strap elements 13, 14 connected to opposite sides of the housing. The strap elements 13, 14 are provided with hook and pile type of fastening elements 15, such as Velcro, for permitting variable adjustments of the of the overall length of the strap elements. The combination of the strap elements and the configuration top surface 27 form a means for facilitating the engagement of the users hand with the upper body of the device. The strap elements are secured to the upper body with fasteners 16.

Figure 1:
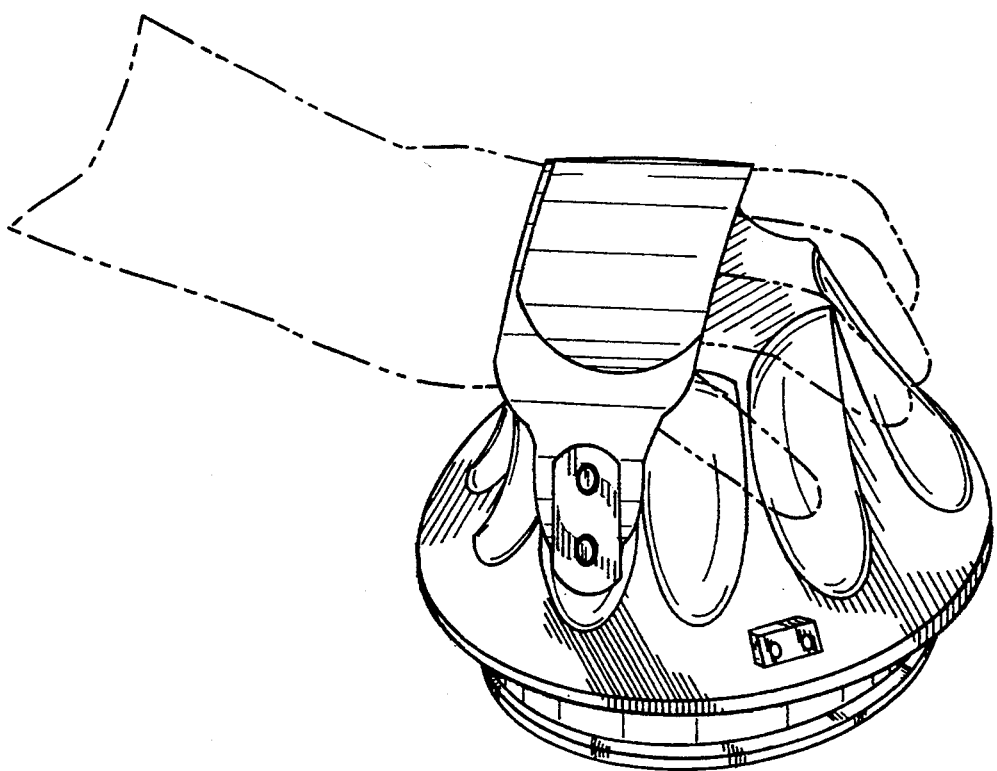
FIG. 1 is perspective view of a portable hand-held cultivator and trimmer for grass and weeds constructed according to the present invention and shown in one manner of operative use.

The sidewalls 23 of the upper body 20 further include an electrical switch 41 for activating an electrical motor 42 that controls the operation of a blade element 46. Thus, with the users hand positioned as shown in FIG. 1, with their palm resting on the top surface 27, the switch element 41 is preferably positioned so that the user can readily activate the switch element with their fingers.

Figure 4:
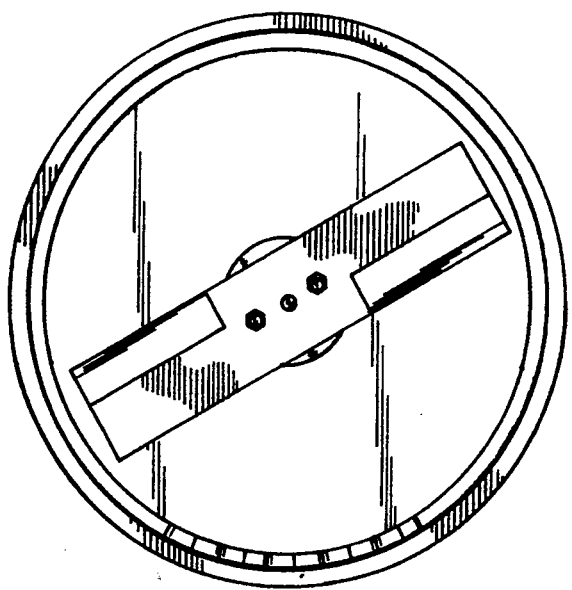
FIG. 4 is a bottom view of the device showing a blade element.

As shown in FIGS. 2, 3, and 4, the lower body 30 includes a circumferential sidewall 31 that is releasably connected to the base portion 21 of the upper body 20 by means of detent elements 29 extending through the upper base portion to frictionally or otherwise securely engage the lower portion circumferential sidewall. Obviously, other suitable known means may be employed instead to releasably couple the upper portion to the lower portion such as snap fitments, fasteners, matable threaded sections on the parts, or the like. A support plate 33 is secured to the circumferential sidewall 31 to define a cavity 34 for receiving a blade element 46 which is positioned to rotate within the cavity 34. As shown in the side views of FIGS. 2 and 3, the lower body 30 includes a cultivator element 36 shown as consisting of a plurality of projections extending from the lower edge 32 of the lower body 30. While the cultivator element 36 is depicted as being formed integrally with the lower body, it is understood that the cultivator element could be formed as a separate element which is bolted or otherwise removably secured to the lower body. This will facilitate the use of a variety of different or replaceable cultivator elements. In FIG. 2, the cultivator 36 is positioned below the switch element 41 so that with a users finger positioned adjacent to the switch element 41 and with their palm positioned over the top surface 27 of the upper body, the cultivator element 36 will be positioned in front of the users hand, much in the manner of an extension of the hand. By providing ergonometric positioning of the various elements of the device, undue stress and strain on various parts of the users fingers, hand and wrist can be reduced. In accordance with the invention, the cultivator element may advantageously be used as a "comb" to precisely guide small branches and shoots of plants into the path of the cutting blade in a manner believed apparent without further discussion.

As previously indicated, the upper body 20 and the lower body 30 are releasably connected to each other to permit access to the interior of the device and to allow replacement of the parts of the device. In FIGS. 2 and 3, the releasable coupling is provided in the form of a press-fit type coupling in which the upper body and lower body are held together by frictional engagement. While not specifically shown, it is contemplated that other types of coupling mechanisms could be used such as a bayonet or twist lock coupling, interlocking latch elements attached to both the upper body and the lower body, or a snap-fit coupling where tab projections on one body engage recessed areas in the other body.

Figure 5:
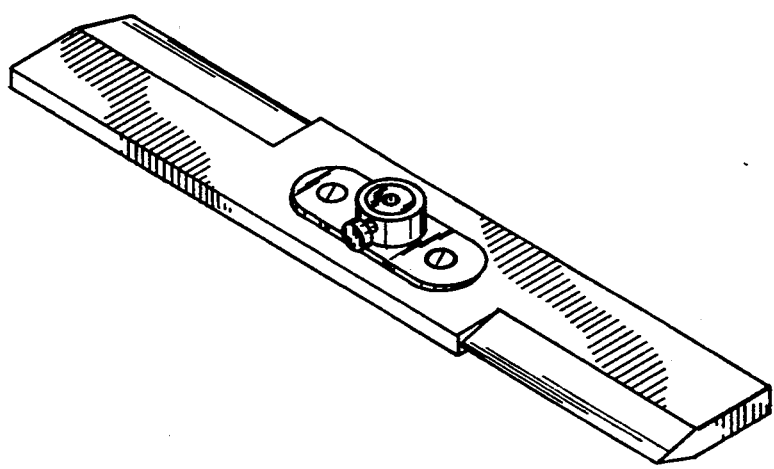
FIG. 5 is a perspective view of a blade element.
Figure 6:
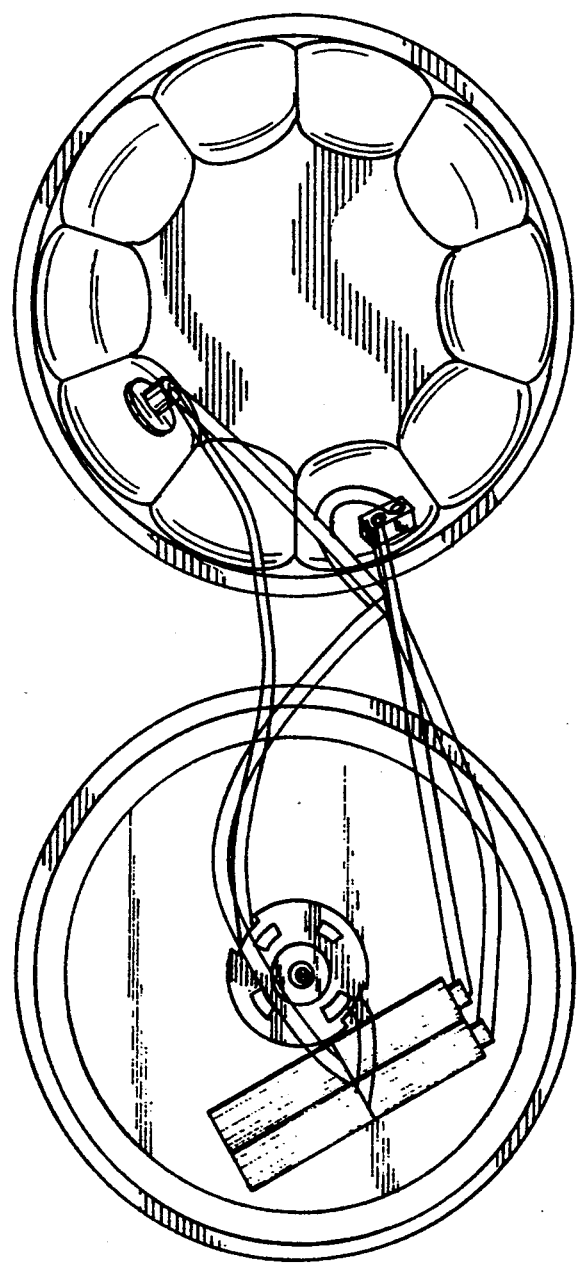
FIG. 6 is a view of the interior of the device taken generally along lines 6—6 of FIG. 3.

FIG. 6 shows the upper body 20 and the lower body 30 broken apart to expose the interior of the device. The switch element 41 is connected to both an electric motor 42 and batteries 44 for supplying energy to the electric motor 42. A preferred arrangement would include installing rechargeable batteries in the device with a recharging plug 45 secured to the sidewalls 23 of the upper body 20. The electric motor 42 and the batteries 44 are removably connected to the support plate 33 so that the lower body 30 can be separated from the device for cleaning purposes. The electric motor 42 is of a common type used in small appliances, characterized by an elongated drive shaft 43 that extends beyond the electric motor 42 for connection to the blade element 46. As presently constructed, the drive shaft 43 of the electric motor is positioned to extend through the support plate 33 and it projects into the cavity 34 formed in the lower body. The cavity is defined by the circumferential sidewall 31 and support plate 33. The blade element 46 shown in FIGS. 4 and 5 includes a removable fitting 47 that is connected to the blade element 46 with screws. The removable fitting 47 has a central cylindrical collar portion 48 provided with a tightening screw for securing the drive shaft 43 to the blade element 46. This permits disassembly of the lower body 30 from the upper body 20 and separation of the blade element 46, the electric motor 42 and the batteries 44 from the lower body 30 to facilitate cleaning of the device and replacement of the various parts thereof.

While a preferred method of use is generally shown in FIG. 1 with the users hand placed over the top surface 27 and the users fingers engaging the sidewalls 23 of the device, it is contemplated that other arrangements for grasping the device are also permitted by the structure of the present invention. For example, while the sidewalls 23 with their sloping and curved configuration form a means for allowing the comfortable grasping of the device when the hand is positioned in FIG. 1, the users hand could also be positioned to wrap around and grasp the device from the side of the device with the users thumb and fingers engaging the sidewalls in a transverse manner. The compact manner of the design wherein the device can be used by either hand, allows the device to be used in compact spaces where the circumferential sidewall is placed over the grass or other vegetation to be cut and the electrical switch is then activated to operate the blade element. This allows precise cutting of weeds and other vegetation which often grow among flowers and potted plants without damage to the flowers or the users fingers.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A portable hand-held cultivator and trimming device comprising:
    a housing having an upper body and a lower body;
    the upper body having a base portion, generally vertically extending sidewalls having upper and lower portions with the lower portions connected to the base portion, and a top surface secured to the upper portions of the sidewalls in which the sidewalls slope inwardly from the lower portions toward the upper portions so that the upper body has the general configuration of an inverted truncated cone to allow a user to grasp the upper body with the user's fingers engaging the sidewalls of the upper body;
    the lower body connected to the base portion of the upper body and the lower body having a circumferential sidewall and a support plate connected to the circumferential sidewall to form a cavity;
    strap means connected to the upper body and extending across the top surface of the upper body for maintaining the user's hand in a fixed position on the upper body with the user's hand inserted between the strap means and the upper body;
    power supply means secured to the support plate of the lower body and the power supply means including an electric motor positioned on the support plate; batteries supported on the support plate and connected to the motor for supplying power thereto and a switch connected to the electric motor and the batteries for selectively supplying electrical energy to the electric motor; and
    a blade element for trimming plants and cutting grass and weeds positioned within the cavity defined by the circumferential sidewall and the support plate, and the blade element is connected to the electric motor for rotational movement within the cavity.

2. The device according to claim 1, further comprising:
    cultivator means projecting from the circumferential sidewall for use in digging and cultivating soil.

3. The device according to claim 1, further comprising:
    coupling means connected to the upper and lower bodies of the housing for frictionally connecting the upper and lower bodies together for use in operative condition.

4. A portable hand-held cultivating and trimming device comprising:
    a housing having an upper body and a lower body;
    the upper body having a base portion, generally vertically extending sidewalls having upper and lower portions with the lower portions connected to the base portion, and a top surface secured to the upper portions of the sidewalls, wherein the sidewalls and the top surface form a means for allowing the device to be grasped by a user's hand with the palm of the user's hand normally resting on the top surface of the cultivator and the fingers of the user contacting the sidewalls of the upper body, the sidewalls of the upper body being circumferentially continuous therearound, said sidewalls lacking a handle projecting therefrom which would preclude placement of the user's hand at any orientation along the top surface with the palm of the user's hand resting on the top surface of the cultivator and the fingers of the user contacting the sidewalls of the upper body;

the lower body connected to the base portion of the upper body and the lower body having a circumferential sidewall;

a blade element for cutting grass and weeds positioned within the circumferential sidewall of the lower body of the housing;

support plate means positioned within and secured to the housing within the circumferential sidewall of the lower body of the housing;

motor means mounted to the support plate means and mechanically coupled to the blade element to effect rotation of the blade element relative to the housing; and, power supply means electrically connected to the motor means for selectively energizing said motor means.

5. The device according to claim 4, further comprising:

elongated strap means connected to opposite sidewalls of the upper body and extending across the top surface of the upper body for maintaining the user's hand in operative contact with the housing when the user's hand is inserted between the elongated strap means and the top surface of the upper body.

6. The device according to claim 4, wherein;

the support plate means comprises a support plate connected to the circumferential sidewall of the lower body and the blade element is supported on the support plate within a cavity defined by the circumferential sidewall and the support plate.

7. The device according to claim 6, further comprising:

coupling means connected to the upper body and the lower body for releasably coupling the upper body to the lower body.

8. The device according to claim 6, wherein;

the motor means comprises an electric motor supported on the support plate and connected to the blade element for rotating the blade element when power is supplied thereto and further comprising a switch connected to the electric motor and rechargeable batteries for supplying power to the electric motor.

9. The device according to claim 8, wherein;

the switch is connected to the sidewalls of the upper body so that when the user's hand is grasping the housing the user's fingers are positioned to contact the switch.

10. The device according to claim 9, further comprising:

a plug element connected to the sidewalls of the upper body and connected to the rechargeable batteries so that a source of electrical energy can be connected to the plug element for recharging the rechargeable batteries.

11. The device according to claim 4, further comprising:

cultivating prong extensions extending from the circumferential sidewall of the lower body for use in digging in and cultivating soil and for guiding items to be trimmed into said blade element.

12. The device according to claim 4, wherein;

the upper portions of the sidewalls of the upper body slope inwardly so that the upper body has the general appearance of an inverted truncated cone.

13. The device according to claim 4, wherein;

the sidewalls of the upper body comprise elongated curved recessed portions at their upper portions to define a plurality of scalloped edges at their intersection with the top surface of the upper body so that the scalloped edges form a means for positively engaging the user's hand during use.

14. A portable hand-held grass and weed trimming device comprising:

a housing having an upper body and a lower body and a support plate positioned within the housing and connected to the housing so that the support plate and the lower body define a cavity in the housing;

a blade element positioned within the cavity for trimming plants and cutting grass and weeds;

electrical supply means connected to the support plate and connected to the blade element for producing movements of the blade element to cut grass and weeds, the electrical supply means including an electrical motor connected to the blade element and a switch element attached to the housing and the electric motor so that when a user grasps the housing the fingers of the user may contact the switch element for activating the electrical motor; and a cultivator means secured to the lower body of the housing for use in cultivating and digging in soil and dirt, wherein the cultivator means is positioned generally adjacent to the switch element.

* * * * *